(12) United States Patent
Wong (10) Patent No.: US 12,091,778 B2
(45) Date of Patent: Sep. 17, 2024

(54) DEVICE AND METHOD FOR APPLYING NANOFIBERS AND/OR MICROFIBERS ONTO A SUBSTRATE, AND SYSTEM COMPRISING THE DEVICES

(71) Applicant: NANOSHIELDS TECHNOLOGY LIMITED, Hong Kong (CN)

(72) Inventor: Siu Wah Wong, Hong Kong (CN)

(73) Assignee: NANOSHIELDS TECHNOLOGY LIMITED, Hong Kong (CN)

( * ) Notice: Subject to any disclaimer, the term of this patent is extended or adjusted under 35 U.S.C. 154(b) by 301 days.

(21) Appl. No.: 17/629,644

(22) PCT Filed: Jul. 24, 2020

(86) PCT No.: PCT/IB2020/056987
§ 371 (c)(1),
(2) Date: Jan. 24, 2022

(87) PCT Pub. No.: WO2021/014413
PCT Pub. Date: Jan. 28, 2021

(65) Prior Publication Data
US 2022/0243363 A1 Aug. 4, 2022

Related U.S. Application Data

(60) Provisional application No. 62/877,931, filed on Jul. 24, 2019.

(51) Int. Cl.
*D01D 5/00* (2006.01)
*D04H 1/4382* (2012.01)
(Continued)

(52) U.S. Cl.
CPC .......... *D01D 5/0084* (2013.01); *D01D 5/003* (2013.01); *D01D 5/0069* (2013.01);
(Continued)

(58) Field of Classification Search
CPC .... D01D 5/0084; D01D 5/003; D01D 5/0069; D04H 1/43838; B82Y 40/00; B82Y 30/00
See application file for complete search history.

(56) References Cited

U.S. PATENT DOCUMENTS 8,512,741 B2 * 8/2013 Tan ...................... A61L 27/3821
424/443
2016/0083868 A1 * 3/2016 Park ...................... D01D 5/0069
425/174.8 E
(Continued)

FOREIGN PATENT DOCUMENTS

CN 107858774 A 3/2018
CN 109137177 A 1/2019
(Continued)

OTHER PUBLICATIONS

Patent Cooperation Treaty, "International Search Report" mailed in connection to International Application No. PCT/IB2020/056987 on Nov. 3, 2020, 5 pages.

*Primary Examiner* — Monica A Huson
(74) *Attorney, Agent, or Firm* — NYEMASTER GOODE, P.C.

(57) ABSTRACT

It provides a device for applying nanofibers and/or microfibers onto a substrate (S). It also provides a system comprising a plurality of such devices which are controlled to operate independently. The system allows for depositing of a gradient material in various parameters including material thickness, fiber pore size, fiber diameter, fiber content and the like. It also relates to a method for applying nanofibers and/or microfibers onto a substrate (S).

20 Claims, 7 Drawing Sheets

(51) Int. Cl.
*B82Y 30/00* (2011.01)
*B82Y 40/00* (2011.01)

(52) U.S. Cl.
CPC .......... *D04H 1/43838* (2020.05); *B82Y 30/00* (2013.01); *B82Y 40/00* (2013.01)

(56) References Cited

U.S. PATENT DOCUMENTS

2020/0232121 A1* 7/2020 Finnegan ................ D01D 5/084
2023/0167591 A1* 6/2023 Soliman ................. B82Y 30/00

FOREIGN PATENT DOCUMENTS

| EP | 1059106 B1 | 8/2004 |
| WO | 03016601 A1 | 2/2003 |
| WO | 2005024101 A1 | 3/2005 |

* cited by examiner

DEVICE AND METHOD FOR APPLYING NANOFIBERS AND/OR MICROFIBERS ONTO A SUBSTRATE, AND SYSTEM COMPRISING THE DEVICES

CROSS-REFERENCE TO RELATED APPLICATION

This application claims benefit of U.S. Provisional Application having Ser. No. 62/877,931 filed on 24 Jul. 2019, which is hereby incorporated by reference herein in its entirety.

FIELD OF THE INVENTION

The present invention provides a device for applying nanofibers and/or microfibers onto a substrate. The present invention also provides a system for applying a material comprising nanofibers and/or microfibers onto a substrate comprising a plurality of such devices and a method for applying the material onto a substrate. The applied material is preferably a gradient material in various parameters including material thickness, fiber pore size, fiber diameter, fiber content and the like.

BACKGROUND OF THE INVENTION

The importance of materials with porous structure made from fibers in the nanoscale and/or submicron scale increases rapidly due to the properties of highly porous structure, narrow pore size, and distribution and specific surface area, which leads to a variety of applications in face mask, air filtration, water purification, liquid filtration, desalination, distillation, tissue engineering, protective clothing, composites, battery separators, sensors, wound dressing, etc.

Electrospinning is one of the techniques to generate high quality fibers with a diameter ranging from a few tens of nanometres to a few tens of micrometres for the fabrication of polymeric materials with porous structure. Nanospider electrospinning technology having a conveyor string electrode or a static string electrode has been applied for mass production of materials with porous structure. The effective electrostatic field on a thin string benefits the spinnability of various polymeric solutions.

It is favourable but challenging to achieve appropriate diameter distribution of the fiber, in furtherance that it is demanding to achieve porous structure layers with different fiber diameters depending on the applications of the resulting materials with porous structure. The diameter distribution can be changed through the properties of the polymeric solutions and electrospinning parameters (applied voltage, distance between electrodes, solution properties and speed of application of polymeric solution).

Accordingly, it is desirable to have electrospinning device and method that have precise control of fiber diameter and adapted to be used various polymeric solutions, such that the size and components of the fiber as well as the porous structure of the material can be achieved easily with higher flexibility.

SUMMARY OF THE INVENTION

The present invention has been developed to fulfill the needs noted above and therefore has a principle object of provision of a device for applying nanofibers and/or microfibers onto a substrate for production of a material comprising one or more layers of nano- and/or micro-structure. The multiple layers applied on the substrate may be composed of a micron fibrous layer, an interlaced layer comprising micron fibers and nanofibers, and a nanofibrous layer.

Another object of the invention is to interlace nanofibers with microfibers, leading to formation of multiple layers for gradient in fiber diameter to provide gradient filtration for the substrate.

A yet object of the invention is to apply functionalized nanofibers and/or microfibers onto a substrate, and the nanofibers and/or microfibers may possess antibacterial function.

The above and other objects can be achieved by a device comprising:

at least one spinning electrode comprising an electric conducting string, a solution applicator connected to a polymeric solution tank and configured to apply the polymeric solution onto the electric conduction string, the solution applicator being carried on the electric conducting string in an axially reciprocating fashion, a collection electrode arranged with respect to the at least one spinning electrode for generation of an electrostatic field which induces an electrospinning zone between the collection and spinning electrodes, wherein the polymeric solution applied onto the electric conduction string is energized to be electrospun into nanofibers and/or microfibers, and a substrate disposed between the spinning electrode and the collection electrode, onto which the nanofibers and/or microfibers are directly deposited.

The electric conducting string may be made of conducting metal or other conductive material. Preferably, the electric conducting string is mounted substantially perpendicular to a direction along which the substrate moves in electrospinning zone.

The electric conducting string may comprise one or more wires, in order to increase the polymeric solution holding capacity of the electric conducting string, and also provide a higher flexibility for solvent and/or polymer precursor selection. In one embodiment, the electric conducting string comprises two or more wires, which may be twisted together. As such, the two or more wires twisted together would increase the surface area of the electric conducting string in order to hold a wider range of polymeric solutions.

A high voltage power supply is connected across the spinning electrode and the collection electrode for generation of the electrostatic field. A high voltage differential between the spinning electrode and the collection electrode generated is sufficient for drawing or attracting the nanofibers and/or microfibers from the polymeric solution under the effect of an electrostatic field.

The device may further comprise a first adjustment mean for controlling the position of the spinning electrode, and a second adjustment mean for controlling the position of the collection electrode. The adjustment means may be a manual or a motor-driven adjustment means. The motor-driven adjustment means is coupled to the control unit, and is able to bring the spinning electrode and the collection electrode into their appropriate positions.

The device may further comprise sensor units coupled to the adjustment means and control unit, and are used for detecting the respective positions of the spinning electrode and collection electrode.

A driving mean is provided to facilitate the movement of the solution applicator. An electric pump is also provided to supply the polymeric solution from the polymeric solution tank to the solution applicator, and apply the polymeric solution onto the electric conducting string. Those feasible solution applicators known in the art can be used in the device of the present invention for applying polymeric solution onto the electric conducting string.

A gas ventilation system can be provided to control a temperature and a gas content within the device. In one embodiment, hot air is used to dry the fibers deposited on the substrate after leaving the electrospinning zone.

Preferably, a guiding arrangement is provided to guide the movement of the substrate.

Optionally, adhesive may be applied on the substrate before entering the electrospinning zone. In this instance, the device further comprises means to apply an adhesive onto the substrate before entering the electrospinning zone.

The device may further comprise control units for controlling the components and parameters of the device.

The device may further comprise a display device to display the parameters of the device, and the progress of deposition of fibers on the substrate.

The substrate can be a flat and planar sheet. The substrate can also be in the form of discrete sheets or continuous sheet. The substrate can be in the form of a nonwoven fabric and may comprise one or more polymer-based microfibers selected from polypropylene, polyester, nylon, polyethylene, polyurethane, cellulose, polybutylene terephthalate, polycarbonate, polymethylpentene and/or polystyrene, and feasible polymers known in the art.

The polymeric solution may comprise at least one polymer precursor and at least one solvent. The polymeric solution may further comprise one or more functional agent to functionalize the electrospun nanofibers and/or microfibers. The functional agent may include biocides to functionalize the electrospun nanofibers and/or microfibers with antimicrobial, antiviral and/or antibacterial properties. Preferably, nanoparticles of the functional agent may be added into the polymeric solution to functionalize the fibers.

The diameter of the nanofibers or microfibers can be controlled by adjusting the distance between the spinning electrode and the collection electrode, applied voltage, properties of the polymeric solution, and moving speed of the solution applicator. Accordingly, a web of nanofibers or microfibers can deposited to have gradient pore size Optionally, the resulting substrate deposited with the nanofibers and/or microfibers can be repeatedly entering the device to allow further depositing of the nanofibers and/or microfibers of same type from the previously deposited fibers to increase the thickness of the fiber layer, or nanofibers and/or microfibers of different diameter and/or polymer identity to form two or more layers of fibers, leading to formation of a material comprising multiple layers of nanofibers and/or microfibers for gradient filtration for a filter element which may be useful for a facemask. This porous material comprises one or more features of interlaced structure with fibers of different diameters, core-shell nanofibers for delivery of active ingredients, nanoparticle-coated nanofibers, and/or electrospun fibers with nano-branches.

The device provides a layer comprising an interlaced structure which is formed by nanofibers and/or microfibers produced and deposited on the substrate by varying one or more parameter selected from the group consisting of solution viscosity, surface tension, conductivity, applied voltage of the polymeric solution, applied speed of the polymeric solution onto the electric conducting string, and a distance between the spinning electrode and the collection electrode to vary a diameter of the electrospun nanofibers and/or microfibers.

A second aspect of the present invention provides a system applying nanofibers and/or microfibers onto a substrate, comprising a plurality of the devices of the present invention. The plurality of devices are arranged with one another in side to side relation to induce a plurality of respective electrospinning zones in which a fiber material comprising multiple fiber layers of nanofibers and/or microfibers is deposited onto the substrate. The electric conducting strings of the plurality of devices are arranged parallel to each other.

In one embodiment of the invention, the system comprises at least two adjacent devices which are configured to deposit nanofibers and/or microfibers of different diameters, and positioned in such a way that between the two adjacent devices is created an intermediate electrospinning zone where the nanofibers and/or microfibers of different diameters are interlaced to form an interlaced structure. Particularly, the plurality of devices are configured to deposit a gradient fiber material of multiple layers onto the substrate when the substrate moves from upstream to downstream of the system. More particularly, the gradient fiber material includes a material comprising at least two types of nanofibers, and a material having interlaced structure of nanofibers with microfibers, wherein the gradient fiber material has a gradual change in fiber density, pore size, fiber diameter, fiber content and/or material thickness.

In one specific embodiment of the invention, the system may be used to deposit multiple layers of nanofibers, microfibers and/or nanofibers interlaced with microfibers.

Each device of the system can be provided independently and configured to have its own power supply, electric conducting string, polymeric solution, solution applicator, spinning electrode and collection electrode. With such an arrangement, the system of the invention can deposit onto the substrate with a greater flexibility, when passing through the plurality of device, a material comprising nanofibers of desirable diameters, a gradient fiber material comprising at least two types of nanofibers, and a material having interlaced structure of nanofibers with microfibers. Herein the "gradient" refers to the material's properties, for example fiber density, pore size, type of fiber and fiber diameter, and so forth.

In one embodiment of the invention, a guiding arrangement may be provided to guide the movement of the substrate between the spinning electrode and the collection electrode from upstream to downstream of the system. Preferably, the direction of movement of the substrate is substantially perpendicular to the electric conducting strings. Accordingly, the fiber drawn from the polymeric solutions applied onto the electric conducting strings in electrospinning zones can be deposited on the substrate sequentially from the upstream device to the downstream device.

In one embodiment of the invention, a gas ventilation system may be provided to the system to control a temperature and a gas content within the system.

In one embodiment of the invention, a central control unit is provided for controlling the devices of the system.

This system according to the invention provides ease and convenience of making a gradient material of nanofiber and/or microfiber structure, which is useful as a filtration material or a filtration barrier, and eliminates the need of separately making the nanofibers, microfibers and their interlaced structure, respectively, thereby greatly reducing the production time and operation costs. In certain embodiments, the diameter of the first fiber can be in the range of nanometer and the diameter of the second fiber can be in the range of micrometers.

Various polymeric solutions and electrospinning parameters can be used to produce fibers of different diameters.

The polymeric solutions of same type or different types may be loaded to the plurality of devices to deposit same type or different types of fiber contents onto the substrate. In one embodiment, the polymeric solution used in the invention is PA6 with a solvent selected from a 2:1 mixture of acetic acid and formic acid, or dimethyl formamide (DMF). The distance between the electric conducting strings of the devices and moving speed of the substrate passing through the system may be adjusted to control the thickness of multiple layers, for example three layers including first layer, intermediate layer and second layer. In certain embodiments, a first functionalized polymeric solution is prepared for manufacturing submicron fibers, and a second functionalized polymeric solution is prepared for manufacturing nanofibers. The first and second polymeric solutions may be functionalized by different functional groups depending on the actual needs for the fibers to be manufactured. The filtration material manufactured as such may be used to make face masks. Preferably, a layer of biocides (e.g. silver nanoparticles or other suitable biocides) may be crosslinked to the nanofibers or microfibers.

In a specific embodiment of the system, eight devices of the invention may be deployed for generating multiple layers for gradient filtration for facemask. A suitable number of the devices deployed in the system is possible according to the actual needs and requirements.

Another object of the present invention is to provide a method for applying nanofibers and/or microfibers onto a substrate using the system of the present invention comprising a plurality of the devices. The method comprises the following steps:
  applying a voltage to each pair of the spinning electrode and the collection electrode to generate an electrostatic field which induces an electrospinning zone between the collection and spinning electrodes;
  applying a polymeric solution onto the electric conducting string of the spinning electrode to electrospin nanofibers and/or microfibers in the electrospinning zone;
  feeding the substrate to pass through the electrospinning zone from upstream to downstream to allow for depositing of the nanofibers and/or microfibers onto the substrate to deposit a fiber material comprising multiple fiber layers.

In one embodiment, the method may comprise the step of loading the polymeric solutions of same type or different types to the plurality of devices thereby to deposit same type or different types of fiber contents onto the substrate. In another embodiment, the method may comprise the step of interlacing the nanofibers with the microfibers to form a fiber layer having an interlaced structure. Furthermore, the method may comprise the step of depositing the fiber material having a gradient in fiber density, fiber pore size, fiber diameter, fiber content and material thickness by varying one or more parameter selected from the group consisting of solution viscosity, surface tension, conductivity, applied voltage of the polymeric solution, applied speed of the polymeric solution onto the electric conducting string, and a distance between the spinning electrode and the collection electrode.

DESCRIPTION OF THE INVENTION

Figure 1A:
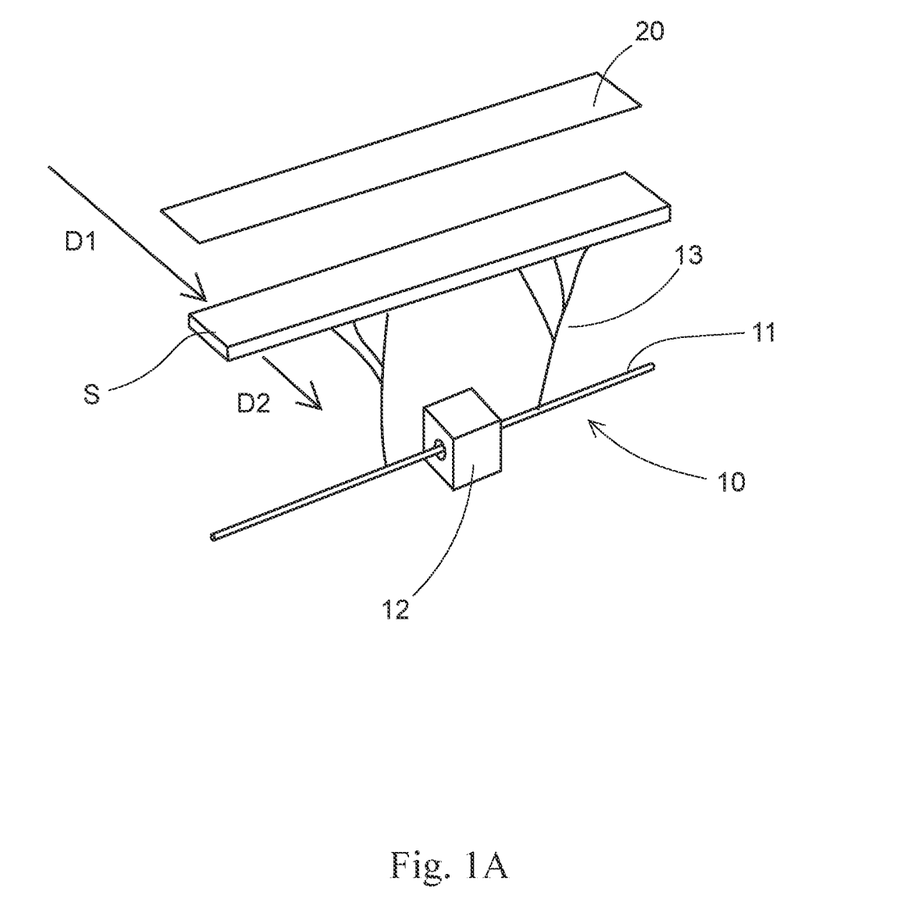
FIG. 1A is a schematic diagram of a device for applying nanofibers and/or microfibers onto a substrate according to a preferred embodiment of the present invention.

With reference to FIG. 1A, a device 1 for applying nanofibers and/or microfibers onto a substrate 1 in accordance with an embodiment of the invention is illustrated. The device 1 comprises a spinning electrode 10 comprising an electric conducting string 11. A solution applicator 12 has a central passage 1212 through which the electric conducting string passes, a main body 1205 and a support 1202 on which the main body 1205 is fixedly supported. The main body 1205 of the solution applicator 12 is displaceable in an axially reciprocating fashion and connected to a polymeric solution tank 1201 to apply a polymeric solution onto the electric conducting string 11 during the reciprocating movement. A collection electrode 20 is arranged in parallel with the spinning electrode 10. An electric voltage (not shown) is applied across the spinning electrode 10 and the collection electrode 20 for generation of an electrostatic field which induces an electrospinning zone between the collection and spinning electrodes. The polymeric solution applied onto the electric conduction string is energized in the electrostatic field to be electrospun into nanofibers and/or submicron fibers. A substrate S is disposed between the spinning electrode 10 and the collection electrode 20, and the electrospun nanofibers and/or submicron fibers are drawn to and directly deposited on the substrate S. The substrate S is fed into the device 1 and movable along a direction from an upstream region D1 to a downstream region D2. A control unit (not shown) is provided to control the movement speed of the substrate S.

The electric voltage differential between the spinning electrode 10 and the collection electrode 20 is sufficient for drawing the fibers 13 from the polymeric solution applied on the electric conducting string 11 in the generated electrostatic field. The control unit is also connected to the electric voltage supply and configured to control the voltage to be applied across the spinning electrode 10 and the collection electrode 20.

Figure 1B:
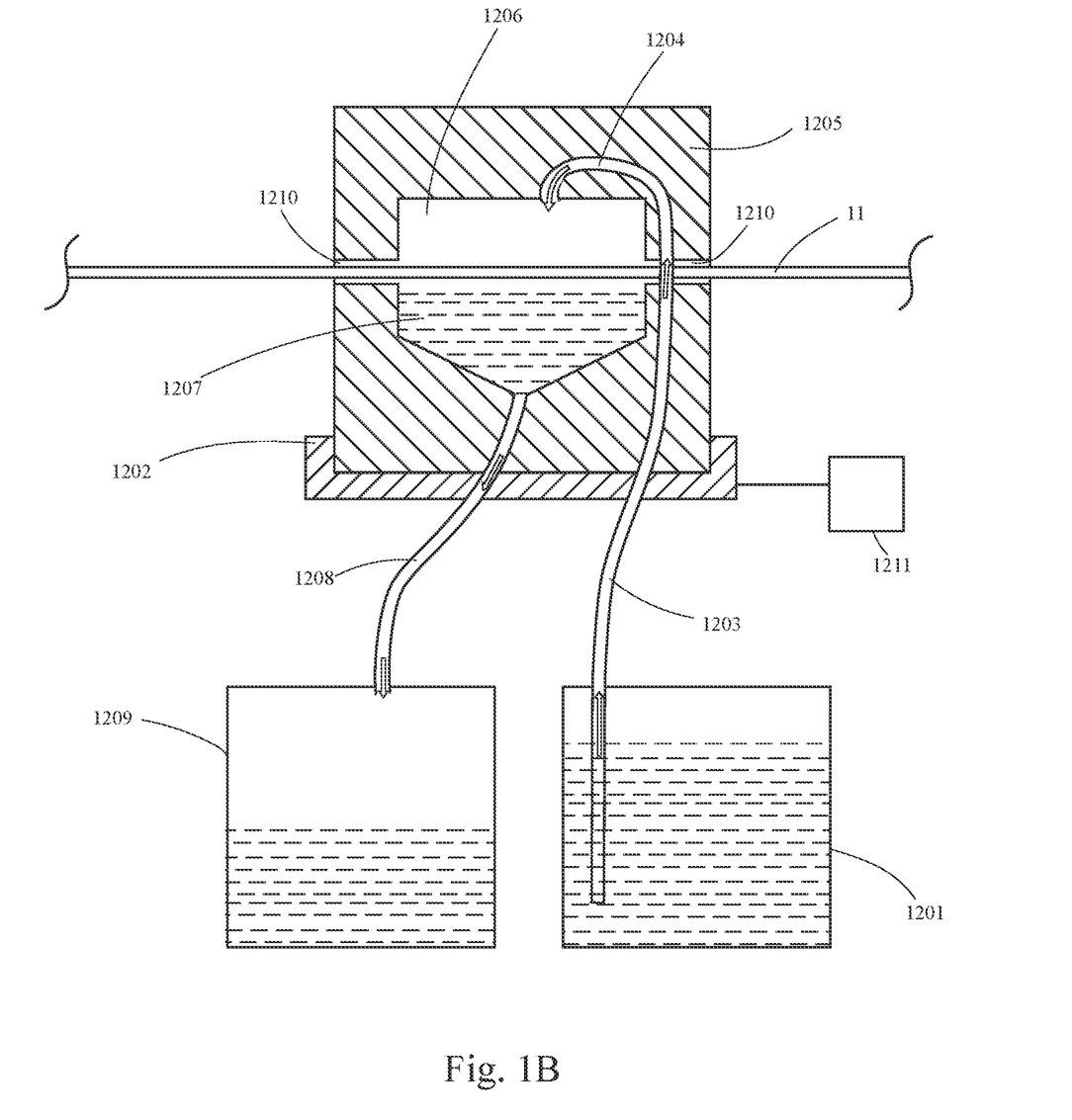
FIG. 1B is a schematic cross-sectional diagram of a solution applicator used in the device shown in FIG. 1A.

FIG. 1B illustrates the solution applicator 12 in cross-section taken along a plane where the electric conducting string 11 lies. The electric conducting string 11 runs through the central passage 1210 of the main body 1205 of the solution applicator 12, but is not in contact with the main body 1205. A fresh polymeric solution is stored in the polymeric solution tank 1201. An electric pump and a control valve (not shown) are provided to feed the polymeric solution from the polymeric solution tank 1201 to an upper chamber 1206 at an inlet channel 1204 through a feeding channel 1203. The upper chamber 1206 and the lower chamber 1207 are at least partially or fully filled with polymeric solution. Excess or prolonged usage of polymeric solution is removed from the upper and lower chambers 1206, 1207 through the outlet channel 1208 and collected in a collecting tank 1209. Further electric pump and control valve (not shown) are also provided to control the polymeric solution removal rate. The main body 1205 of the solution applicator 12 is connected to the polymeric solution tank 1201 and the collecting tank 1209 through hoses. The support 1202 carrying the main body 1205 is driven by driving mean 1211 to drive the main body 1205 to displace in an axially reciprocating fashion along the electric conducting string 11 so as to continuously applying the polymeric solution onto the electric conducting string 11. The spacing between the electric conducting string 11 and the internal surface of the passage 1210 are suitably arranged such that an appropriate amount of polymeric solution is applied on the electric conducting string 11. Preferably, the polymeric solution tank 1201 and the collecting tank 1209 are arranged in a fashion spaced away from the electrospinning zone. The control unit (not shown) is connected to the electric pumps and the control valves, such that the polymeric solution supplying and removal rates can be controlled. The control unit is also connected to the driving mean and configured to control the moving speed of the main body 1205 of the solution applicator 12.

Figure 2:
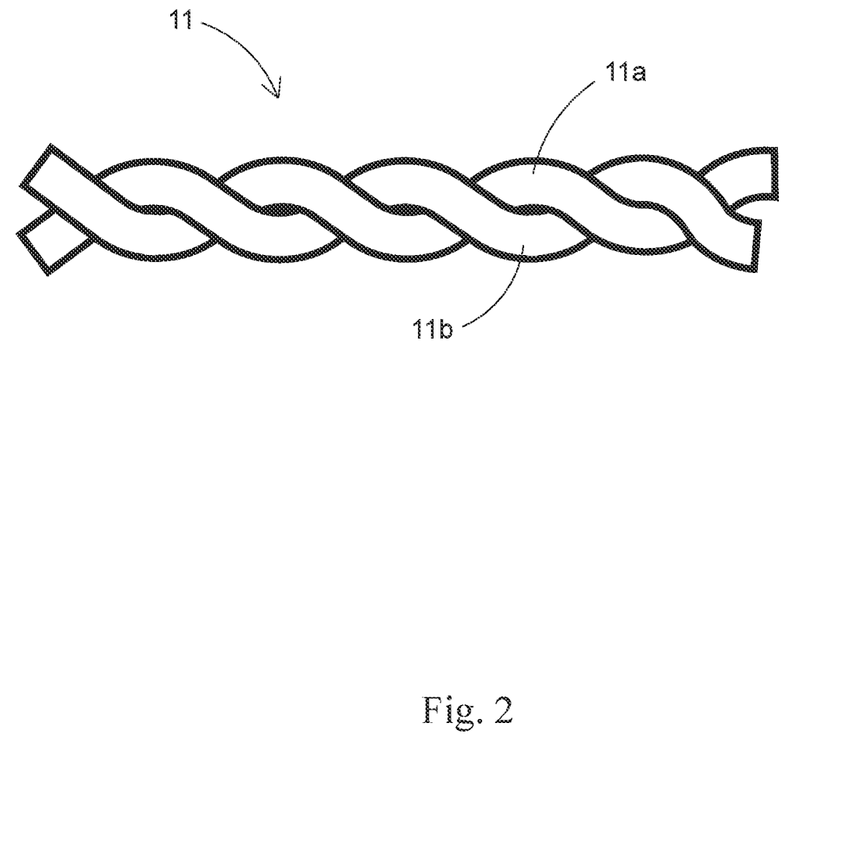
FIG. 2 is an exemplary electric conducting string useful in the device shown in FIG. 1A.

An exemplary electric conducting string 11 of the present invention is shown in FIG. 2. This electric conducting string 11 comprises a first wire 11*a* and a second wire 11*b* which are twisted together to form the electric conducting string 11. The twisting structure enables to increase the solution holding capacity of the electric conducting string 11, providing the flexibility for selection of solvents and polymeric solutions.

Figure 3:
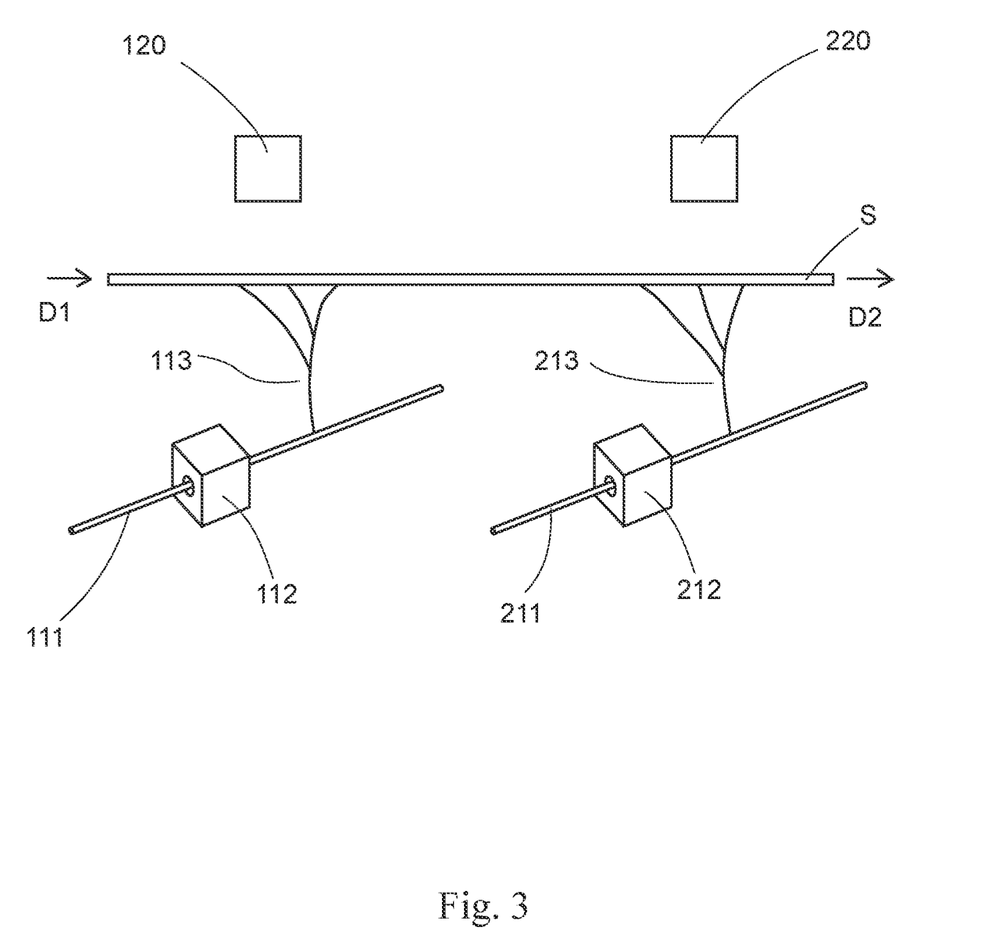
FIG. 3 is a schematic diagram of the system comprising two devices of FIG. 1A.

FIG. 3 illustrates a system constructed according to a preferred embodiment of the invention, comprising first and second devices for applying nanofibers and/or microfibers onto a substrate. The first and second devices are the same as the device discussed above and shown in FIGS. 1A and 1B. The first device is positioned in the upstream region D1, and a first main body of the first solution applicator 112 reciprocate along a first electric conducting string 111 to apply a first polymeric solution. A first electrospinning zone is generated, in which a first fiber 113 of a diameter having few tens of micrometers is electrospun. The second device is positioned in the downstream region D2, and a second main body of the second solution applicator 212 reciprocates along a second electric conducting string 211 to apply a second polymeric solution. A second electrospinning zone is generated in which a second fiber 213 of a diameter having few tens of nanometers is electrospun. The spacing between the first device and the second device, namely a distance between the first collection electrode 120 and the second collection electrode 220 as well as a distance between the first electric conducting string 111 and the second conducting string 211 of the first and second devices are suitably adjusted, so that an intermediate electrospinning zone is generated where the first fibers 113 in the micron magnitude and the second fibers 213 in the nano magnitude are interlaced with each other.

Figure 4:
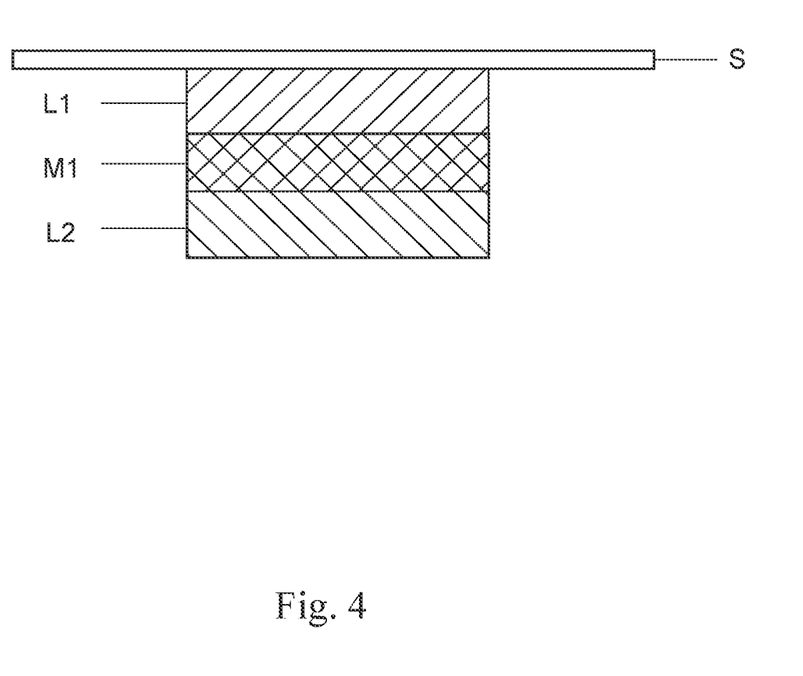
FIG. 4 shows a substrate deposited with a gradient material comprising nanofibers, microfibers and an interlaced structure between the nanofibers and microfibers manufactured by the system of FIG. 3.

The substrate S is fed into the system and is being moving in the direction from the upstream region D1 to the downstream region D2. The first fibers 113 drawn from the first electrospinning zone of the first device are deposited on the substrate S to form a first layer L1 (FIG. 4). When the substrate S deposited with first fiber 113 moves towards the second device and across the intermediate electrospinning zone at controlled and appropriate speed, an intermediate layer M1 is deposited and formed on the first layer L1. The intermediate layer has a gradual decrease in fiber content of the first fiber 113 and a gradual increase in fiber content of the second fibers in the moving direction of the substrate S. When the substrate S continues to move further to reach the second electrospinning zone, the second fibers 213 are deposited on the intermediate layer M1 to form the second layer L2. Therefore, a material having a gradient in pore size in the direction of material thickness is deposited on the substrate S, comprising a first layer 1, the intermediate layer M1 and the second layer L2.

The gradient material is clearly shown in FIG. 4 in schematic view, comprising the first layer L1 of microfiber with larger porous size and the second layer L2 of nanofiber with smaller porous size, therebetween the intermediate layer M1 is sandwiched. The intermediate layer M1 comprises an interlaced structure of the nanofibers and the microfibers. This multilayered porous material has a gradual decrease in porous size in the direction of material thickness from the first layer to the second layer.

Figure 5:
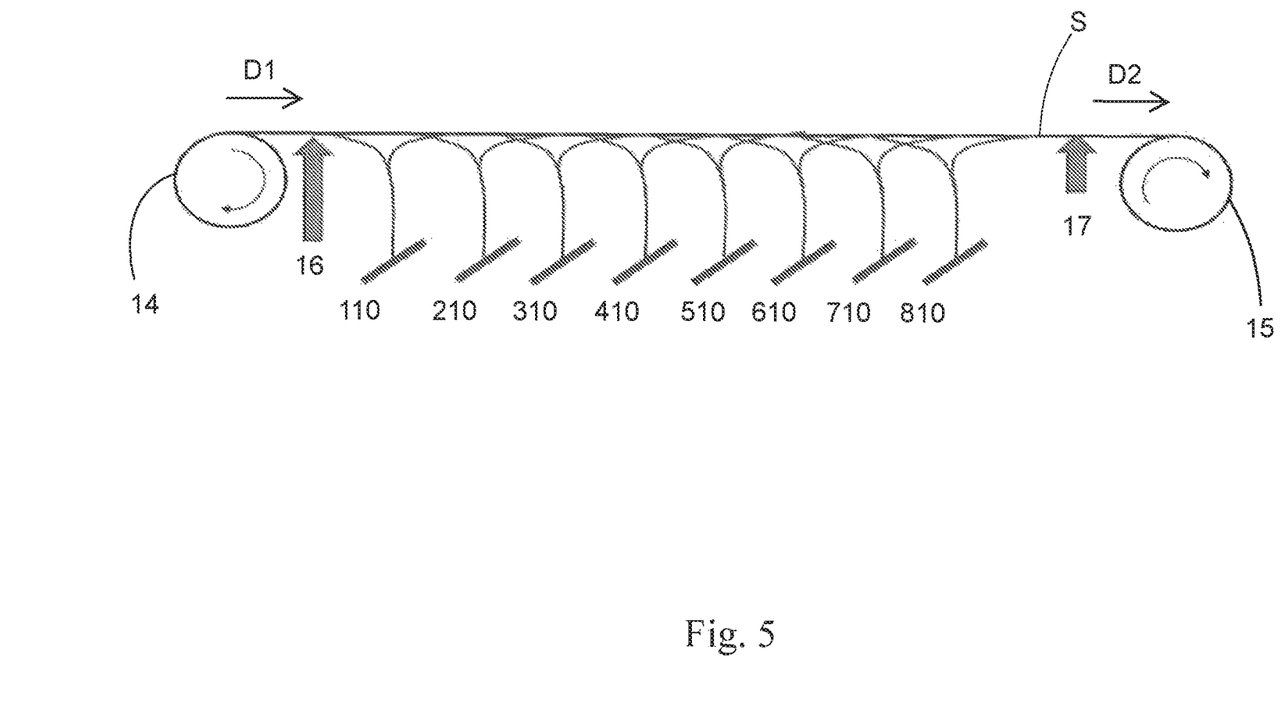
FIG. 5 is a simplified schematic diagram of the system comprising eight devices of FIG. 1A.

FIG. 5 illustrates a system according to another preferred embodiment of the invention, comprising eight devices for applying nanofibers and/or microfibers onto a substrate constructed. All the eight devices are the same as the device discussed above and shown in FIGS. 1A and 1B. The first to fourth spinning electrodes 110, 210, 310, 410 of the first to fourth devices are positioned in parallel in the upstream region D1 to electrospin a first fiber with diameter having few tens of submicron meters, and the fifth to eighth spinning electrodes 510, 610, 710, 810 of the fifth to eighth devices are positioned in parallel in the downstream region D2 to electrospin a second fiber with diameter having few tens of nanometers. The first to fourth devices may be configured to electrospin the submicron fibers of same type or different types, and the submicron fibers are first deposited as a first layer on the substrate S. Similar to the system comprising two devices shown in FIG. 3, an intermediate electrospinning zone may be created between the fourth and the fifth devices to deposit an intermediate layer of interlaced structure of nanofibers and microfibers on the first layer of micron fibers. The fifth to eighth devices may be configured to electrospin the nanofibers of same type or different types, and the nanofibers are deposited on the intermediate layer of the substrate S.

The eight devices are controlled to operate independently and have their respective polymeric solution tanks, therefore different polymeric solutions may be loaded to the devices of the system respectively to obtain different types of fibers. Herein the term "different types" may refer to fibers that are produced using different polymeric solutions and/or that have different average diameters or different average diameter ranges.

Further, each two adjacent devices may be adjusted for their spacing (i.e. electrode distance between the two devices), such that a corresponding intermediate electrospinning zone is created to form an interlaced structure having gradual change in the fiber contents of the fibers produced by the two adjacent devices. The interlaced structure includes interlacing of nanofibers of different types, interlacing of nanofibers of different diameters, interlacing of nanofibers of different pore sizes, interlacing of nanofibers with microfibers, interlacing of microfibers of different types, interlacing of microfibers of different diameters, interlacing of microfibers of different pore sizes.

Figure 6:
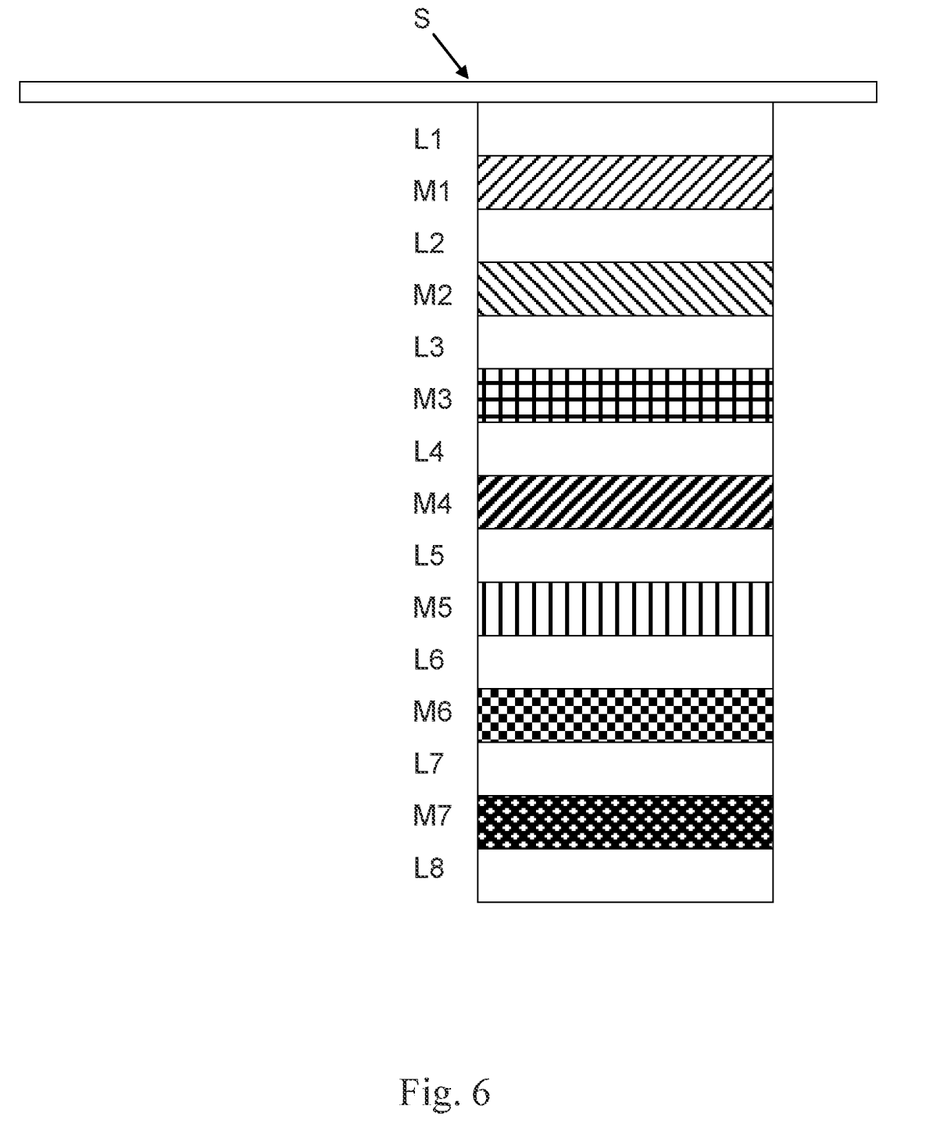
FIG. 6 shows a substrate deposited with a gradient material comprising multiple layers of nanofibers, microfibers and interlaced structures manufactured by the system of FIG. 5.

FIG. 6 illustrated a multilayered material deposited on the substrate S using the system shown in FIG. 5. In this embodiment, eight different polymeric solutions are used to electrospin eight different types of fibers, including different fiber polymers used to manufacture the nanofibers and microfibers, and different diameters of fibers. Additionally, each two adjacent devices are positioned and arranged to create an intermediate electrospinning zone where an intermediate layer comprising an interlacing structure of two types of fibers is deposited. A maximum of seven different types of interlacing structures may be formed in the resulting material. As illustrated, eight different fiber layers (L1-L8) and seven intermediate layers (M1-M7) are deposited on the substrate S in sequence. The substrate S with the gradient material manufactured as such may be used to make face masks or other filtering elements or filtering devices.

In order to provide the fibers for depositing on the substrate S with additional chemical and/or physical functions, the polymeric solutions used for electrospinning the nano- or micro-fibers may be functionalized. In the system of FIG. 5, two different formulations may be used to prepare two polymeric solutions respectively for the first to four devices for electrospinning the submicron fibers, and for the fifth to eight devices for electrospinning the nanofibers. The two polymeric solutions may be functionalized by different functional groups depending on the actual needs for the fibers to be manufactured.

Further, the electrospun fibers may possess antibacterial function. In this regard, the material deposited on the substrate S may further comprise a layer of biocides. For the fabrication of the biocide layer, the polymeric solution prepared for the nanofibers may be blended with a biocide (e.g. silver nanoparticles or other suitable biocides) and a crosslinker so that biocide-crosslinked nanofibers can be electrospun. Alternatively, a crosslinker and a biocide may be bound to the nanofibers or microfibers.

The arrangement of the system provides the flexibility and ease of individually varying the polymeric solutions and electrospinning parameters for the multiple devices, thereby electrospin the fibers of different diameters which may be made from different polymers. One example of the polymeric solutions used in the invention is PA6 with a solvent selected from a 2:1 mixture of acetic acid and formic acid, or dimethyl formamide (DMF). The distance between electric conducting strings and moving speed of the substrate can be adjusted to control the thickness of the first layer, the intermediate layer and the second layer.

It would be appreciated that any number of fibers can be deposited on the substrate using the system of the invention comprising a corresponding number of devices, thereby the resulting material for depositing on the substrate can be formed to provide the desirable filtration properties.

Now turning to FIG. 5, an adhesive 16 is applied to the substrate S before entering the electrospinning zones of the system, and/or hot gas 17 is used to dry the fibers deposited on the substrate S after leaving the electrospinning zones of the system.

The method applying nanofibers and/or microfibers onto a substrate using the system of the present invention is described herein below. The method steps comprising adjusting the position between the two adjacent devices to create an intermediate electrospinning zone, applying a voltage to each pair of the spinning electrode and the collection electrode, activating the electric pumps and control valves to draw the polymeric solution from the polymeric solution tank to the solution applicator, and collecting the polymeric solution at the collecting tank, driving the movement of the solution applicator in an axially reciprocating fashion, applying the polymeric solution onto the electric conducting string of the spinning electrode, applying adhesive on the substrate before entering the electrospinning zone, feeding the substrate to pass through the electrospinning zone and intermediate electrospinning zone from upstream to downstream, and applying hot gas after the substrate leaving the electrospinning zone.

The above-described is preferred embodiments of the system comprising the devices of the present invention. It is understood that the present invention is not limited to the above embodiments, and any appropriate alternatives, modifications, and variations apparent to those skilled in the art can be adopted within the scope of the present invention, as long as they can achieve the effects of the present invention.

The invention claimed is:

1. A device for applying nanofibers and/or microfibers onto a substrate, comprising:
at least one spinning electrode comprising an electric conducting string, wherein the electric conducting string comprises two or more wires,
a solution applicator connected to a polymeric solution tank and configured to apply the polymeric solution onto the electric conduction string, the solution applicator being carried on the electric conducting string in an axially reciprocating fashion,
a collection electrode arranged with respect to the at least one spinning electrode for generation of an electrostatic field which induces an electrospinning zone between the collection and spinning electrodes, wherein the polymeric solution applied onto the electric conduction string is energized to be electrospun into nanofibers and/or microfibers, and
a substrate disposed between the spinning electrode and the collection electrode, onto which the nanofibers and/or microfibers are directly deposited.

2. The device according to claim 1, wherein the polymeric solution comprises at least one polymer precursor and at least one solvent.

3. The device according to claim 2, wherein the polymeric solution further comprises one or more functional agent to functionalize the electrospun nanofibers and/or microfibers.

4. The device according to claim 3, wherein the functional agent includes biocides to functionalize the electrospun nanofibers and/or microfibers with antimicrobial, antiviral and/or antibacterial properties.

5. The fiber production device according to claim 1, wherein an interlaced structure of nanofibers and/or microfibers is produced and deposited on the substrate by varying one or more parameter selected from the group consisting of solution viscosity, surface tension, conductivity, applied voltage of the polymeric solution, applied speed of the polymeric solution onto the electric conducting string, and a distance between the spinning electrode and the collection electrode to vary a diameter of the electrospun nanofibers and/or microfibers.

6. The device according to claim 5, wherein the interlaced structure includes interlacing of nanofibers of different types, interlacing of nanofibers of different diameters, interlacing of nanofibers of different pore sizes, interlacing of nanofibers with microfibers, interlacing of microfibers of different types, interlacing of microfibers of different diameters, interlacing of microfibers of different pore sizes.

7. The device according to claim 1, wherein the electric conducting string is mounted substantially perpendicular to a direction along which the substrate moves in electrospinning zone.

8. The device according to claim 7, further comprises a guiding arrangement to guide the movement of the substrate.

9. The device according to claim 1, further comprises means to apply an adhesive onto the substrate before entering the electrospinning zone.

10. The device according to claim 1, further comprises a gas ventilation system to control a temperature and a gas content within the device.

11. The device according to claim 1, wherein the substrate is a nonwoven fabric comprising one or more polymer-based microfibers selected from polypropylene, polyester, nylon, polyethylene, polyurethane, cellulose, polybutylene terephthalate, polycarbonate, polymethylpentene and/or polystyrene.

12. The device according to claim 1, further comprising a control unit for controlling the spinning electrode and the collection electrode for their positions, and adjustment means coupled to the control unit for moving the spinning electrode and the collection electrode.

13. The device according to claim 12, further comprising sensor units coupled to the adjustment means and the control unit for detecting the respective positions of the spinning electrode and collection electrode.

14. A system applying nanofibers and/or microfibers onto a substrate, comprising a plurality of the devices according to claim 1, wherein the plurality of devices are arranged with one another in side to side relation to induce a plurality of respective electrospinning zones in which a fiber material comprising multiple fiber layers is deposited onto the substrate.

15. The system according to claim 14, wherein at least two adjacent devices are configured to deposit nanofibers and/or microfibers of different diameters, and positioned in such a way that between the two adjacent devices is created an intermediate electrospinning zone where the nanofibers and/or microfibers of different diameters are interlaced to form an interlaced structure.

16. The system according to claim 14, wherein the plurality of devices are configured to deposit a gradient fiber material of multiple layers onto the substrate when the substrate moves from upstream to downstream of the system.

17. The system according to claim 16, wherein the gradient fiber material includes a material comprising at least two types of nanofibers, and a material having interlaced structure of nanofibers with microfibers having a gradient in fiber density, fiber pore size, fiber diameter, fiber content and material thickness.

18. The system according to claim 17, wherein the interlaced structure includes interlacing of nanofibers of different types, interlacing of nanofibers of different diameters, interlacing of nanofibers of different pore sizes, interlacing of nanofibers with microfibers, interlacing of microfibers of different types, interlacing of microfibers of different diameters, interlacing of microfibers of different pore sizes.

19. The system according to claim 14, wherein the polymeric solutions of same type or different types are loaded to the plurality of devices to deposit same type or different types of fiber contents onto the substrate.

20. The device according to claim 1, whereby the two or more wires are twisted together.

* * * * *